(12) United States Patent
Yang et al.

(10) Patent No.: US 6,566,456 B1
(45) Date of Patent: May 20, 2003

(54) METHOD OF PREPARING A HYBRID OF POLYVINYLIMIDAZOLE AND SILICA

(75) Inventors: Jeng-Cheng Yang, Tao-Yuan (TW); Yaw-Shun Hong, Tao-Yuan (TW); Te-Chuan Chang, Tao-Yuan (TW); Yu-Tan Wang, Tao-Yuan (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 63 days.

(21) Appl. No.: 09/706,067

(22) Filed: Nov. 3, 2000

(51) Int. Cl.$^7$ .............................. C08F 226/00; C08F 8/12
(52) U.S. Cl. ..................................... 525/326.5; 525/342
(58) Field of Search ................................ 525/326.5, 342

(56) References Cited

U.S. PATENT DOCUMENTS

| | | | | |
|---|---|---|---|---|
| 5,399,607 A | * | 3/1995 | Nanbu et al. | 525/342 |
| 5,639,825 A | * | 6/1997 | Nanbu et al. | 525/342 |

* cited by examiner

*Primary Examiner*—D. R. Wilson
(74) *Attorney, Agent, or Firm*—Jackson Walker L.L.P.

(57) ABSTRACT

In the present invention, vinylimidazole and [3-(methacryloxy)propyl]trimethoxysilane are copolymerized to form a modified polyvinylimidazole, which then undergoes hydrolysis and condensation reactions with water and tetramethoxysilane to prepare a hybrid of polyvinylimidazole and silica. Experimental analyses show that covalent bondings exist between the modified polyvinylimidazole and silica in the hybrid.

13 Claims, 12 Drawing Sheets

METHOD OF PREPARING A HYBRID OF POLYVINYLIMIDAZOLE AND SILICA

FIELD OF THE INVENTION

The present invention relates to a method of preparing a hybrid of polyvinylimidazole and silica, particularly a method of preparing a hybrid of polyvinylimidazole and silica by a sol-gel process.

BACKGROUND OF THE INVENTION

Organic-inorganic hybrid materials have wide applications due to their excellent transparency, wear resistance, and heat resistance, etc. The applications include coating materials, optical materials, electronic materials and biomedical materials. Such materials, due to their organic/inorganic characteristics, show excellent features when being applied in products containing both the organic and inorganic components therein.

Researches have been carried out prevalently on nitrogen-containing polymers as electron donors. A major reason for such intensive attention lies on their wide applications which include: destabilizing anionic gel in discharges and water purification [S. Neyret, L. Ouali, F. Candau and E. Pefferkorn, J. Colloid Interface Sci., 176, 86, (1995)], electrophoretic deposition [B. Cabot and A. Foissy, J. Mater. Sci., 33, 3945, (1998)], curing agent [J. M. Barton, I. Hamerton, B. J. Howlin, J. R. Jones and S. Liu, Polymer, 39, 1929, (1998)], activation of electrodes [K. Kham, A. Deratani and B. Sebille, New J. Chem., 16, 505, (1992)], recovery of minute metal ions [C. Wu, W. Chen, J. Lee, J. Colloid Interface Sci., 183, 236, (1996); L. Martinot, D. Leroy, C. Jerome and O. Leruth, J. Radioanal. Nucl. Chem., 224, 71, (1997)] and anti-corrosion coating [J. Jang, I. Jang and H. Kim, J. Adhesion Sci. Technol., 12, 323, (1998); J. Jang and H. Ishida, Corros. Sci., 33, 1053, (1992) B. Mouanda, Polymer, 38, 5301, (1997)], etc. Since the synthesis of polyvinlyimidazole (PVI) is rather simple [B. Popping, A. Deratani, B. Sebille, N. Desbois, J. M. Lamarche and A. Foissy, Colliods Surf., A 64, 125, (1992)] and PVI can be formed with a permanent positive charge density by controlling the ionization thereof [R. Bohmer, W. H. A. Heesterbeek, A. Deratani and E. Renard, Colliods Surf. A99, 53, (1995)], applications of polyvinlyimidazole have attracted many researchers.

Silica, having a very low water absorbancy (~0% by weight) and thermal expansion coefficient (~0.5 ppm/K), is an ideal inorganic material for providing polymers with such properties.

According to the literature reports, there are two methods for synthesizing a hybrid of tetravalent PVI and silica: (1) coating a tetravalent PVI compound with silica [N. Thuaud, B. Sebille, A. Deratani, B. Popping and C. Pellet, Chromatographia, 36, 373, (1993)]; and (2) carrying out a cross-linking reaction of PVI adsorbed on the surface of silica [N. Thuaud, G. Lelievre, A. Deratani and B. Sebille, Eur. Polym, J., 33, 1015, (1997); N. A. Taleb, M. C. Millot and B. Sebille, J. Chromatogr. A, 776, 45, (1997)]. However, these hybrids do not form any chemical bonding between the polymer and silica, not to mention forming a stable covalent bonding. Therefore, these hybrids have defects such as a poor thermal stability, or even a problem of phase separation, thereby further affecting the mechanical properties of the hybrids produced.

An objective of the present invention is to provide a method of preparing a hybrid of PVI and silica having covalent bonding therebetween. The invented method can prepare a PVI-silica hybrid with an excellent thermal stability.

SUMMARY OF THE INVENTION

The present invention discloses a method of preparing a hybrid of polyvinylimidazole and silica (PVI-silica hybrid), which comprises the following steps:

a) copolymerizing vinylimidazole and a vinyl-containing alkoxysilane in an organic solvent to form a modified polyvinylimidazole having the following formula I;

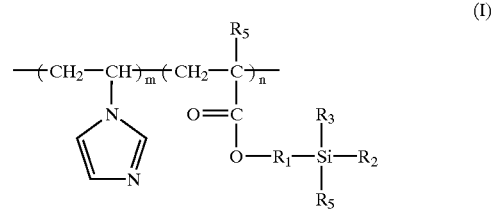

wherein m is an integer of 10–100, n is an integer of 5–30, $R_1$ is C1–C6 alkylene, $R_2$ is C1–C4 alkoxy, $R_3$ and $R_4$ independently are hydrogen, C1–C4 alkoxy or C1–C4 alkyl, and $R_5$ is hydrogen or C1–C4 alkyl; and b) adding water and an organic solution of tri- or tetra-(C1–C4 alkoxy)silane into the resulting copolymerization mixture from step a) to perform hydrolysis and condensation reactions of the modified polyvinylimidazole (I) and the tri- or tetra-alkoxy silane to form a hybrid of polyvinylimidazole and silica comprising the following network structure

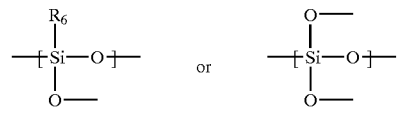

wherein $R_6$ is hydrogen or C1–C4 alkyl.

Preferably, said vinyl-containing alkoxysilane used in step a) is [3-(methacryloxy)propyl]trimethoxysilane.

Preferably, said tri- or tetra-(C1–C4 alkoxy)silane used in step b) is tetra-(C1–C4 alkoxy)silane. More preferably, said tetra-(C1–C4 alkoxy)silane is tetramethoxysilane.

In step a) of the method disclosed in the present invention, preferably the vinylimidazole and [3-(methacryloxy)propyl] trimethoxysilane are used in a molar ratio from 99:1 to 80:20; and a free radical initiator, such as azoisobutyronitrile (AIBN), is used to initiate the copolymerization reaction.

In step b) of the present invention, preferably the tetramethoxysilane and said modified PVI (I) are used in a weight ratio from 35:65 to 10:90; the water to the tetramethoxysilane are used in a mole ratio from 3:1 to 10:1; and an acid, e.g. HCl, is added into water as a catalyst, where the amount of the acid used is 1–5% by weight, based on the total weight of the water and the acid.

Preferably, the organic solvent used in step a) and an organic solvent suitable for preparing the organic solution used in step b) in the present invention are selected from a group consisting of tetrahydrofuran (THF), N-methyl-2-pyrrolidone (NMP), N,N-dimethylacetamide (DMAc), dimethylformamide (DMF), dimethylsulfoxide (DMSO), m-cresol, pyridine (Py), methyl chloride, ethyl chloride and a mixture thereof. More preferably, the organic solvent used in step a) and the organic solvent suitable for preparing the organic solution used in step b) in the present invention is tetrahydrofuran (THF).

DETAILED DESCRIPTION OF THE INVENTION

Figure 1:
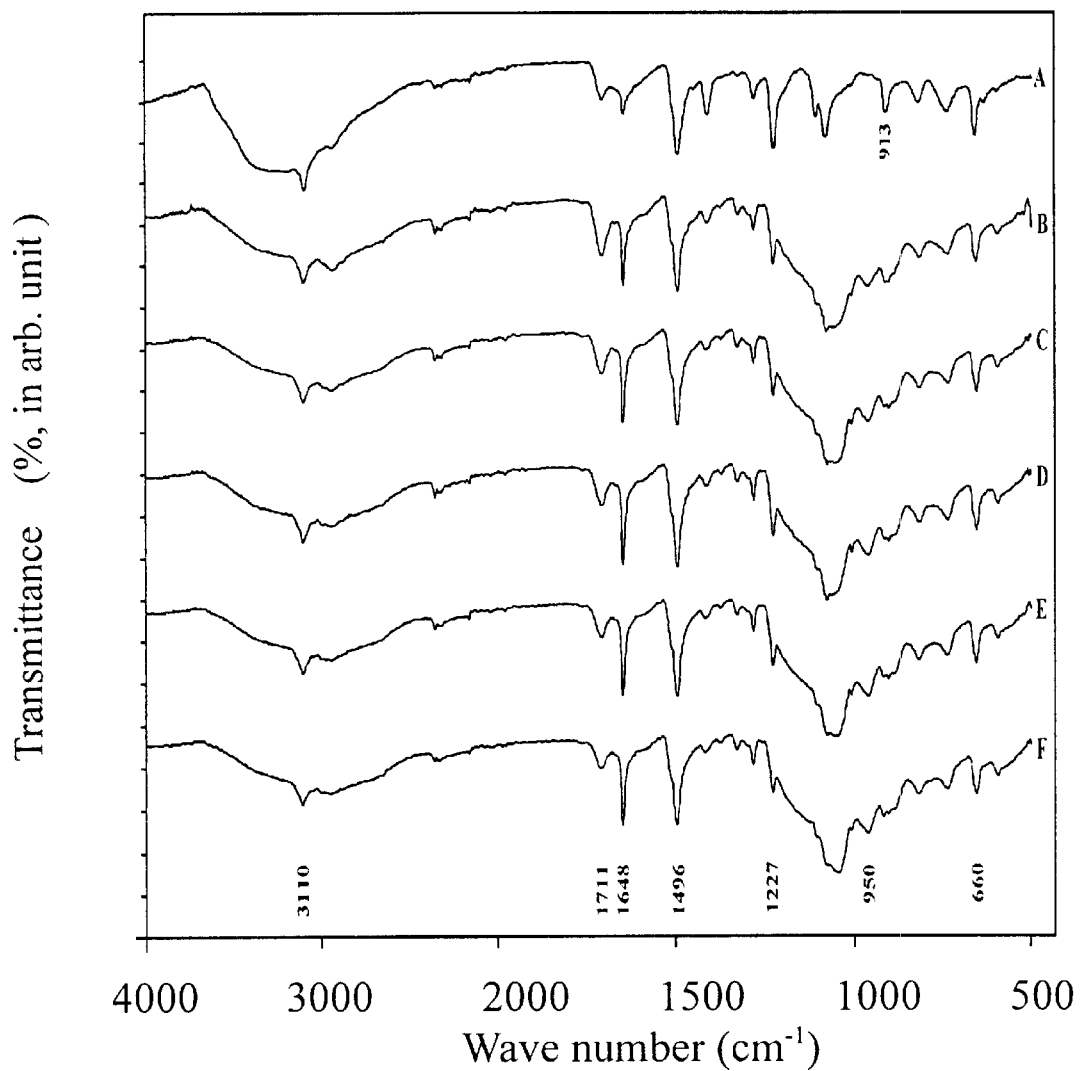
FIG. 1 shows IR spectra of the modified PVI and five PVI-silica (PVI—SiO$_2$) hybrids prepared according to the present invention, wherein A is a modified PVI, M5; and B to F are PVI-silica hybrids of M5–90, M5–85, M5–80, M5–75 and M5–65, respectively.

The present invention uses a sol-gel technique to prepare a hybrid of polyvinylimidazole (PVI) and silica (SiO$_2$) (a PVI-silica hybrid) by reacting a modified PVI with water and tetramethoxy silane (TMOS), wherein the modified PVI is prepared by copolymerizing vinylimidazole and 3-(methacryloxy)propyl trimethoxysilane (MSMA). PVI-silica hybrids having various weight percentages of silica were also prepared by varying the amount of the TMOS used. The structures and properties of the hybrids were investigated by using infrared spectrum (IR), $^{29}$Si and $^{13}$C nucleus magnetic spectra (NMR), differential scanning calorimetry (DSC) and thermogravimetric analysis (TGA). The van Krevelen method was used to calculate the apparent activation energy ($E_a$) of desorbing water and decomposition of PVI bonding in hybrid hydrates. Please refer to the following example for detail.

EXAMPLE

Preparation of PVI-silica Hybrid (According to the Following Scheme 1)

The preparation of a PVI—SiO$_2$ hybrid is shown in Scheme 1. A typical example of the experiment is given as follows: Vinylimidazol (95 mmole; 8.9414 g) and 3-(methacryloxy)propyl trimethoxysilane (MSMA) (5 mmole; 1.2418 g), AIBN (0.1 mmole) and THF (70 ml) were poured into a round bottomed flask to start a copolymeriza-tion reaction at 60° C. under agitation in nitrogen for 8 hours thereby obtaining a modified polyvinylimidazole containing 5 mol % trialkoxy functional groups (abbreviated as M5). Thereafter, an appropriate amount of THF, TMOS (3.9601 g) and hydrochloric acid (1%, 2.8097 g) were added into the reaction mixture to perform a condensation reaction at room temperature under vigorous agitation for about 10 minutes. The reaction product was precipitated by using an excess amount of n-hexane.

The precipitate was collected with filtration, washed by THF, dried at room temperature under atmospheric pressure for 24 hours, and further dried in a vacuum oven at 60° C. for 24 hours, thereby obtaining a condensed hybrid consisting of 65% by weight of M5 and 35% by weight of TMOS (abbreviated as M5–65). Similarly, hybrids of M5–90, M5–85, M5–80, M5–75, and M5–70 containing 90%, 85%, 80%, 75% and 70% by weight of M5, respectively, were also prepared.

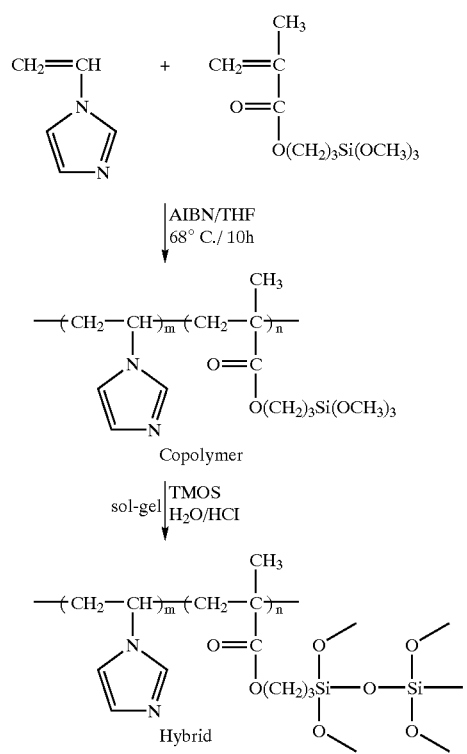

Scheme 1

Characteristics of PVI-silica Hybrid

After a PVI—SiO$_2$ hybrid and KBr had been made into a salt flake, an IR spectrum Bomen DA 3.002 was used to identify its polymerization reaction. A Bruker MSL-400 nuclear magnetic resonance device was used to determine the $^{13}$C and $^{29}$Si NMR spectra of the PVI—SiO$_2$ hybrid by the cross-polarization and CP/MAS techniques. Self-spin of $^1$H-τlocking-pulse generated in sequence after the cross-polarization was used to measure the self-spin-lattice relaxation time required by a proton in a spin structure ($T^H_{1\rho}$). The $^1$H 90° pulse width was 4.5 micro-seconds. The contact time of cross-polarization was 2 mini-seconds. The duration of delay time of $T^H_{1\rho}$ ranges from 0.1 to 10 mini-seconds. $T^i$ and $Q^i$ were nomenclatured according to Glaser et al. $T^i$ and $Q^i$ separately represented a species with one and without organic side-chain radical, and "i" represented the number of —O—Si group bonded to a Si atom. The relative content of $T^i$-species and $Q^i$-species were obtained by calculation from experimental spectrum data. The DSC was a Perkin- Elmer 7 series, and the measurement was carried out on a sample of 8 mg in nitrogen at a scanning rate of 10° C./min. The characteristics and kinetics of pyrolysis of the hybrid were measured by a Perkin-Elmer TGA-2 with a heating rate of 10° C./min in nitrogen and air, separately. The test specimen was about 10 mg and the flowing rate of gas was kept at 100 ml/min.

Results

FIG. 1 shows the IR spectra of copolymers M5, M5–90, M5–85, M5–80, M5–75, and M5–65. The IR spectrum of M5 copolymer (curve A in FIG. 1) shows characteristic absorption peaks of the following: 3410 cm$^{-1}$ (O—H stretching vibration), 3700~2800 cm$^{-1}$ (hydrogen bonding between O—H and residual water), 3110 cm$^{-1}$ (C=C—H/ N=C—H stretching vibration), 1496 cm$^{-1}$ (C=C/C=N stretching vibration), 1227 cm$^{-1}$ (ring vibration), 660 cm$^{-1}$ (twist stretching), 1711 cm$^{-1}$ (C=O free vibration), 1282 cm$^{-1}$ (absorption of ester functional group of MSMA), 1080 cm$^{-1}$ (Si—O—CH$_3$ bending vibration). The IR spectra of all hybrids show the four characteristic peaks (3110, 1496, 1227 and 660 cm$^{-1}$) of vinylimidazole and the two characteristic peaks (1709 and 1282 cm$^{-1}$) of MSMA, as shown by curve B to curve F in FIG. 1. On the other hand, the Si—OH stretching vibration (950 cm$^{1}$) of the hybrid is viewed as a defect in the whole structure. The intensity of the peaks of Si—O—Si (1100–1000 cm$^{1}$) increases with respect to the intensity of the peak of imidazole (1496 cm$^{-1}$), when the amount of TMOS used increases. This indicates that the three dimensional Si—O—Si structure is resulted from a cross-linking of the copolymer and the hydrolyzed TMOS.

Figure 2:
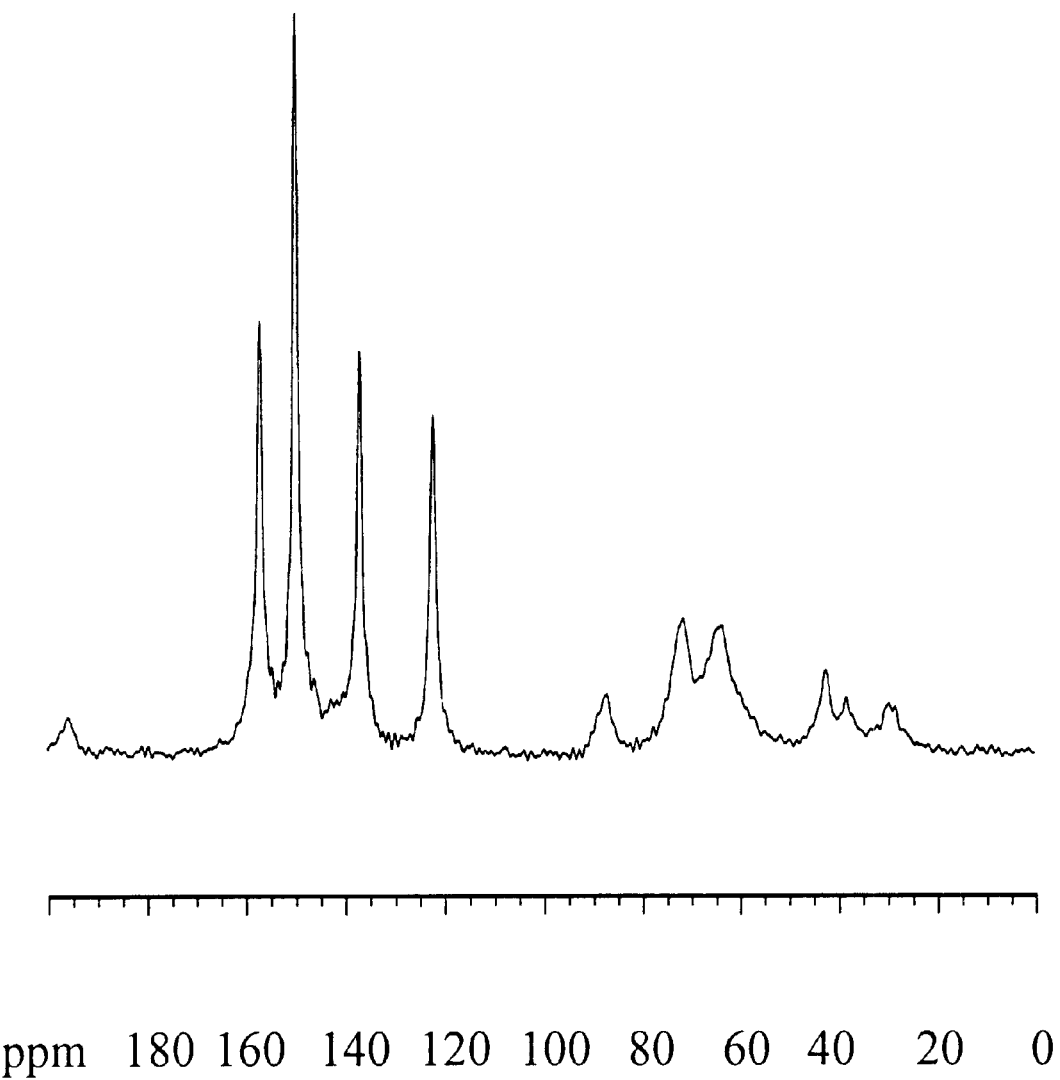
FIG. 2 is a $^{13}$C-CPMAS spectrum of the PVI-silica hybrid, M5–85.

FIG. 2 shows a $^{13}$C-NMR spectrum of the M5–85 hybrid. The absorption peaks at 138, 131 and 117 ppm represent the imidazole ring of the polyvinylimidazole unit, and the absorption peaks at 177, 70, 24, 18 and 10 ppm represent the absorption-peaks of the MSMA unit. Furthermore, the absorption peaks at about 55 and 46 ppm are caused by the overlapping of two reaction monomers. If the spin-locking model is used on the $T^H_{1\rho}$ measurement, the $T^H_{1\rho}$ value of the imidazole ring in the M5 copolymer (~7.0 ms) coincides with the $T^H_{1\rho}$ value of the imidazole ring in the PVI polymer (~7.4 ms). The $T^H_{1\rho}$ value of the imidazole ring in the PVI—SiO$_2$ hybrid is ~3.2 ms, which is lower than that of the M5 copolymer. This result further verifies the formation of chemical bondings between the M5 copolymer and silica.

Figure 3:
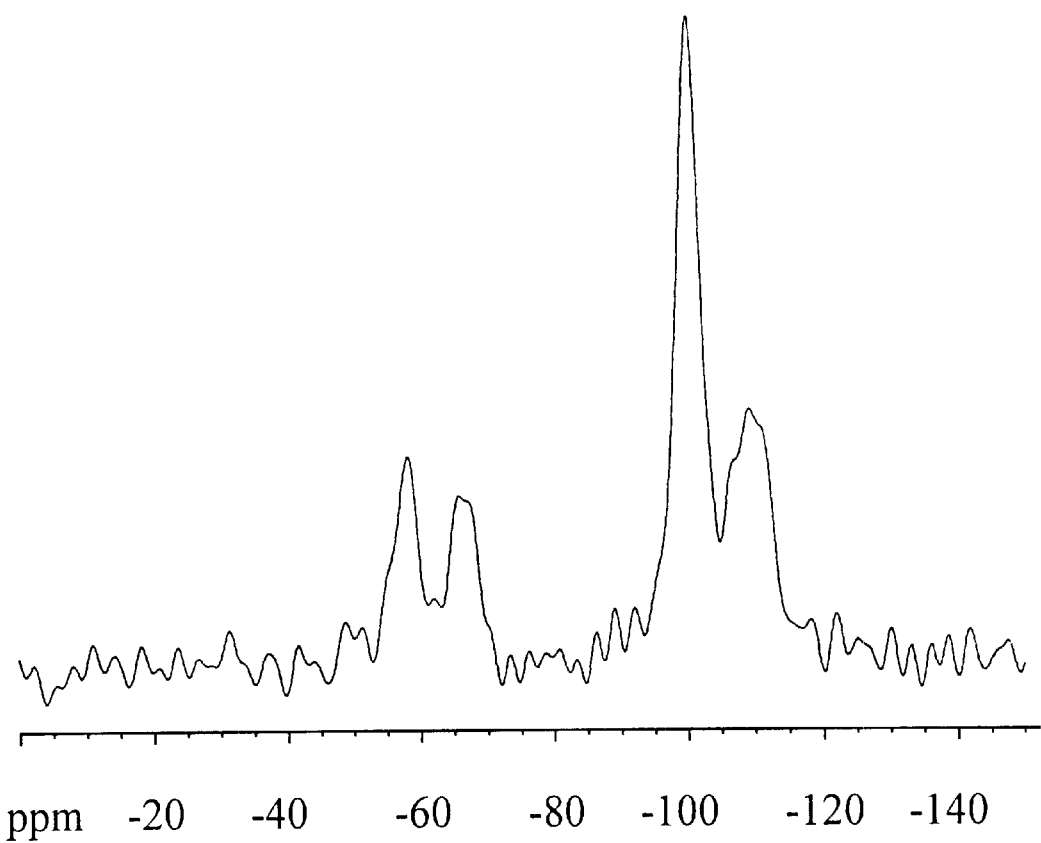
FIG. 3 shows a $^{29}$Si MAS spectrum of the PVI-silica hybrid, M5–80.
Figure 3A:
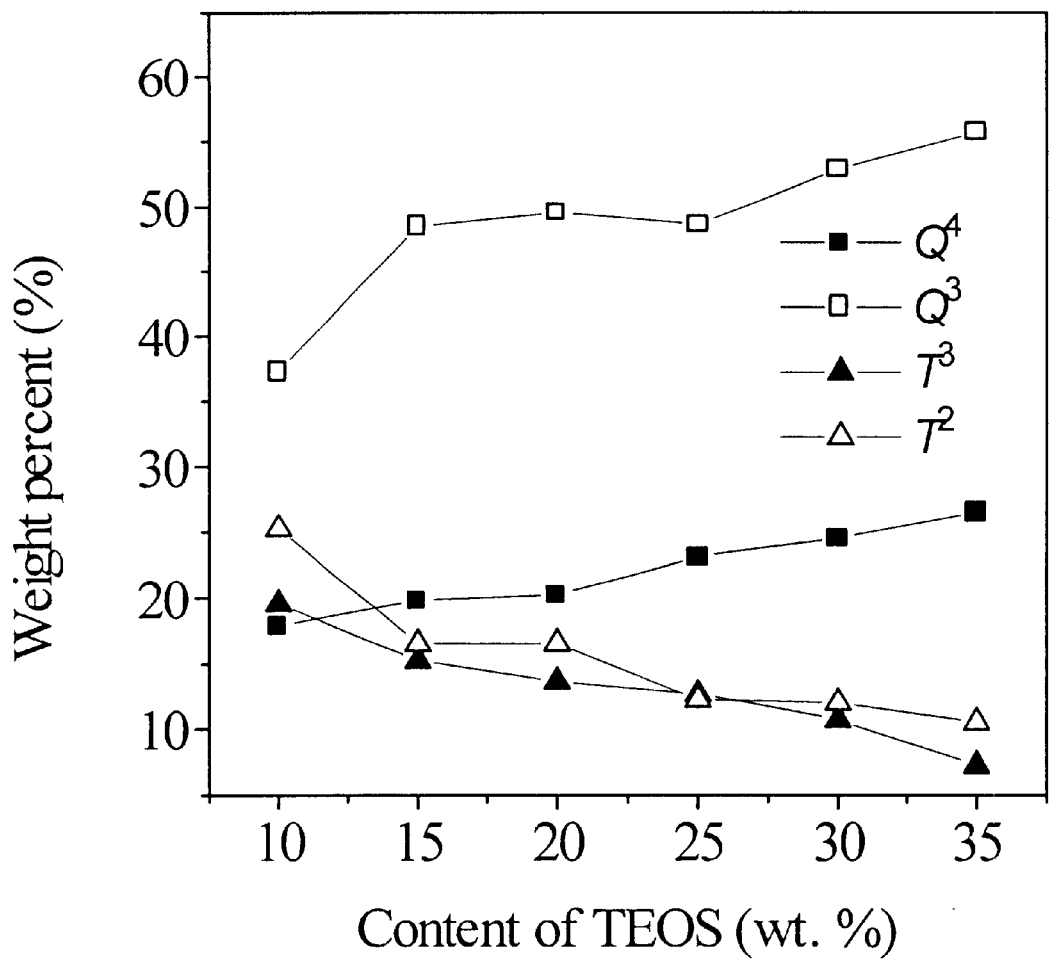
FIG. 3a shows the effect of the weight percentages of TMOS used on the structures of the PVI-silica hybrids prepared according to the present invention.

FIG. 3 shows the $^{29}$Si single pulse excited MAS spectrum of the M5–80 hybrid which has four distinct peaks at –57, –66, –100 and –108 ppm representing the absorption locations of T$^2$, T$^3$, Q$^3$ and Q$^4$, respectively. Moreover, the two shoulders at the –49 and –91 ppm positions are the absorption peaks of T$^1$ and Q$^2$, respectively. By comparing the ratio of the Q$^i$ intensity to the T$^i$ intensity, FIG. 3a shows that the ratio increases along with an increase in the amount of TMOS used. This indicates that the three-dimensional silica structure increases proportional to the amount of TMOS used.

Figure 4:
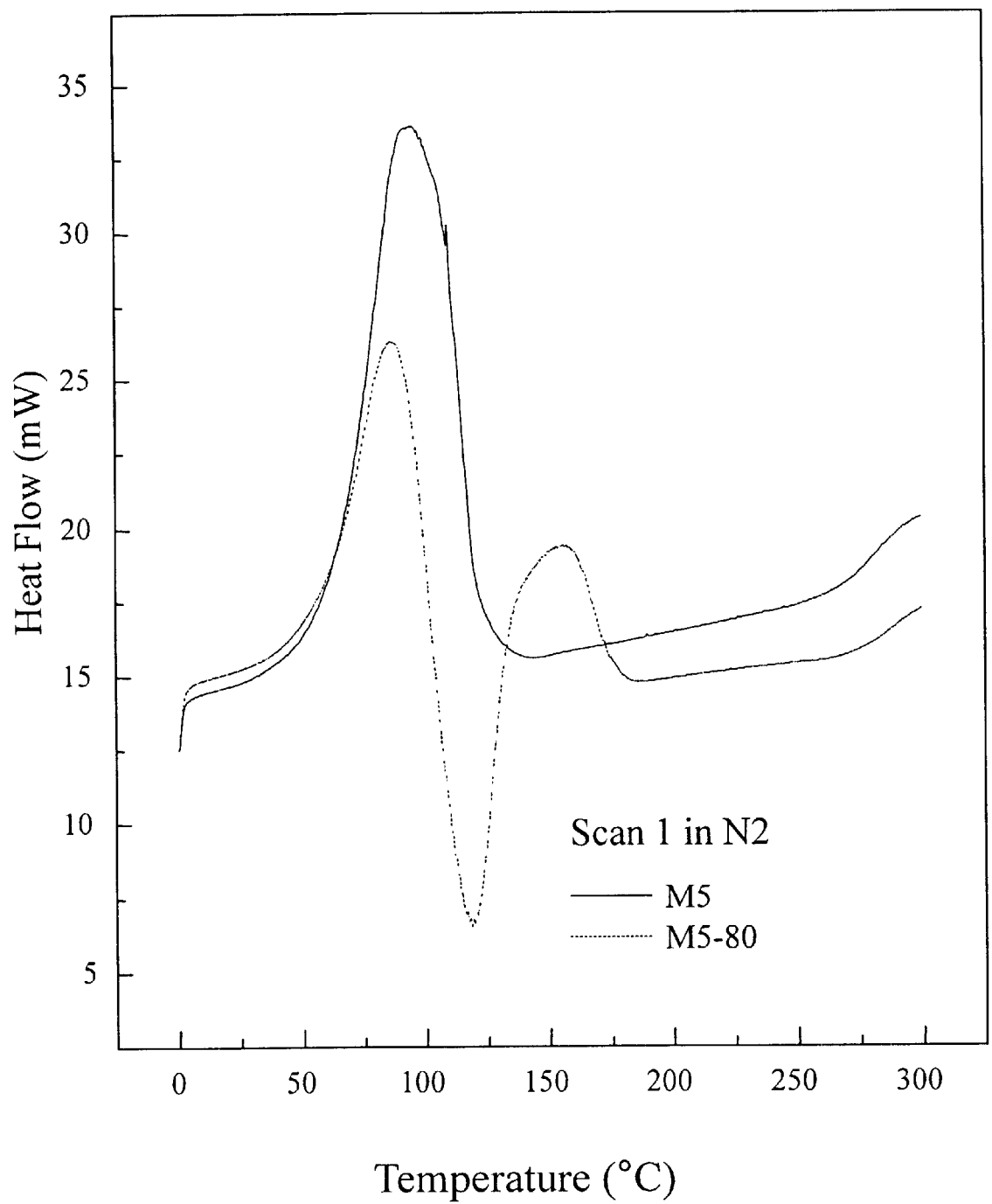
FIG. 4 and FIG. 4a show the first and second DSC (differential scanning calorimetry) curves of the PVI-silica hybrid, M5–80, and the modified PVI, M5.
Figure 4A:
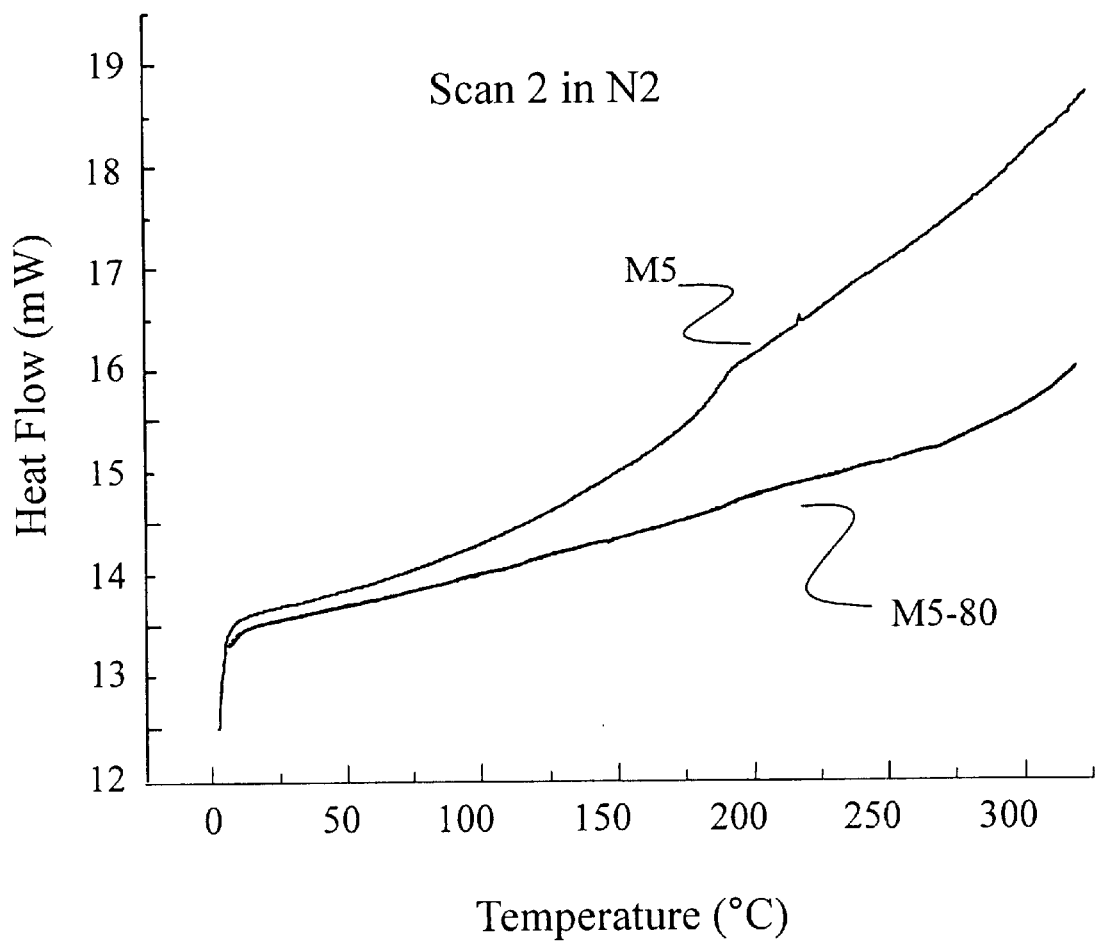

FIG. 4 and FIG. 4a show the first and second DSC scanning of the M5 copolymer and the M5–80 hybrid in nitrogen. The first DSC scanning curve of the M5 copolymer has a first exothermic peak from 20 to 140° C. with the highest point at about 90° C. caused by the evaporation of water. The second DSC scanning curve has a glass transition temperature at about 172° C., indicating that the evaporation of water in the heating process causes a cross-linking reaction of SiOH. The first DSC scanning of the M5–80 hybrid has an exothermic peak at about 85° C., immediately followed by an endothermic peak at about 120° C. This endothermic peak represents removal of water left on the surface of silica. This indicates that the Si—OH groups spread over the silica surface in the acid-catalyzed sol-gel reaction. The second DSC scanning curve of the M5–80 hybrid shows that its T$_g$ (178° C.) was higher than that of the M5 copolymer. This shift indicates that the side chains of the M5 copolymer form bondings with the rigid silica.

Figure 5:
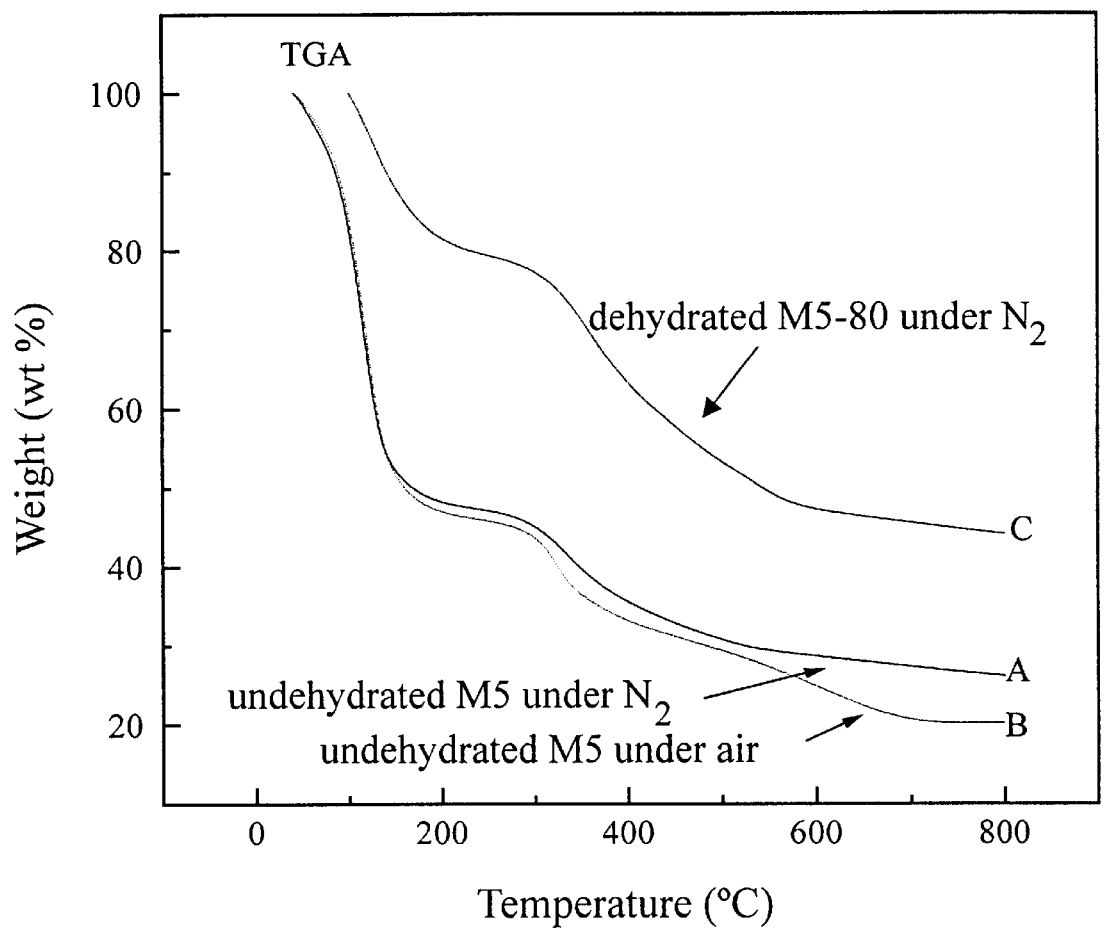
FIG. 5 and FIG. 5a shows the TGA (thermogravimetric analysis) and DTG (differential thermogravimetric analysis) curves of the PVI-silica hybrid, M5–80, wherein A represents a non-fully dehydrated hybrid tested under nitrogen; B represent a non-fully dehydrated hybrid tested under air; and C represents a dehydrated hybrid tested under nitrogen.
Figure 5A:
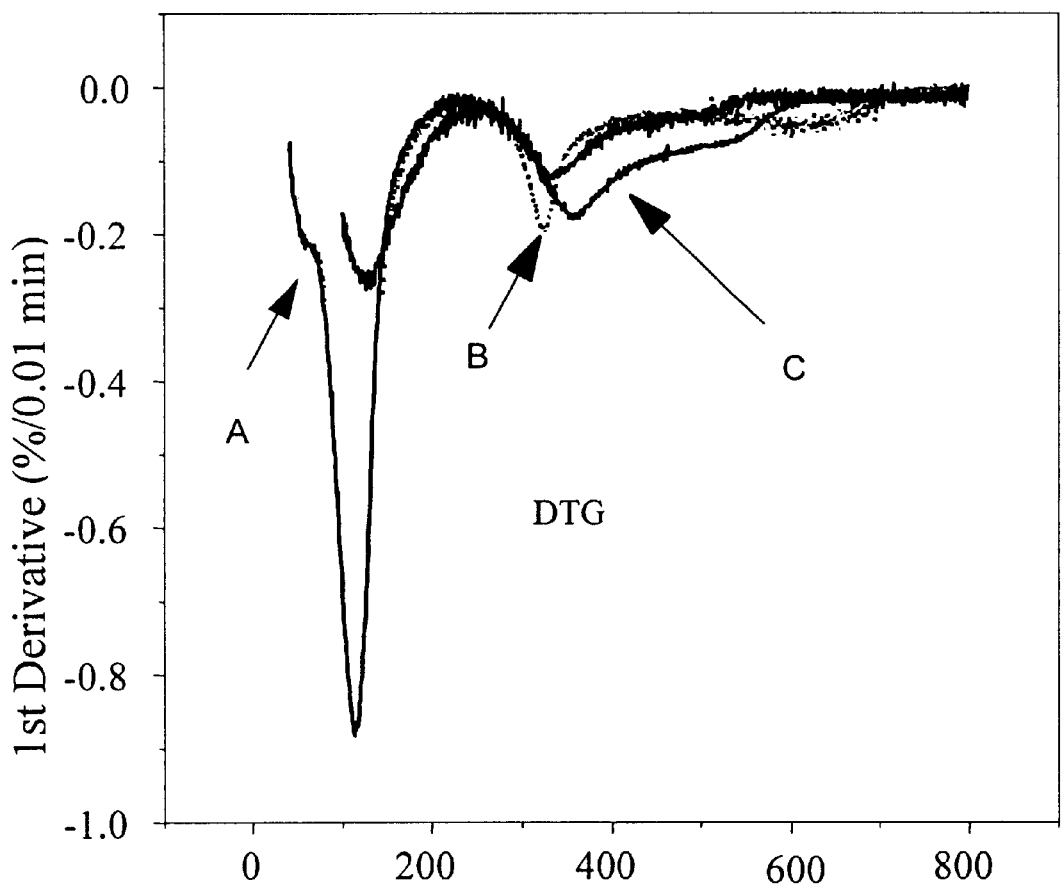

FIGS. 5 and 5a show the TGA and differential thermogravimetric analysis (DTG) curves of the M5–80 hybrid in nitrogen atmosphere. There are three main pyrolysis stages observed from the DTG curves. Each peak temperature was obtained from a simulation curve. T$_{1m}$ and T$_{2m}$ m are the temperatures of the maximum rate of weight loss in the first pyrolysis stage and the second pyrolysis state, which are 115 and 330° C., respectively. These values are substantially independent from the atmosphere and the silica content. The weight loss and weight loss rate at the first stage of the M5–80 hybrid in nitrogen (Curve A) is substantially the same as in air (Curve B). However, the weight loss and weight loss rate at the first stage of the dehydrated M5–80 hybrid in nitrogen decrease (Curve C). After dehydration, the T$_{1m}$ value of the dehydrated hybrid in nitrogen is about 130° C. Therefore, the most unstable stage in weight loss for a non-fully dehydrated hybrid is dehydration. Dehydration not only takes place near the imidazole group, but also occurs on the surface of the acidic Si—OH. These results are consistent with the DSC spectra. A polymer with a long side chain has a low ceiling temperature, and is liable to free radical pyrolysis. Therefore, the weight loss between 200 and 300° C. is due to the decomposition of ester bonds, and between 300 and 580° C. is due to cleavage of PVI bonds. The third stage (758° C.) is a condensation reaction of OH groups.

Figure 6:
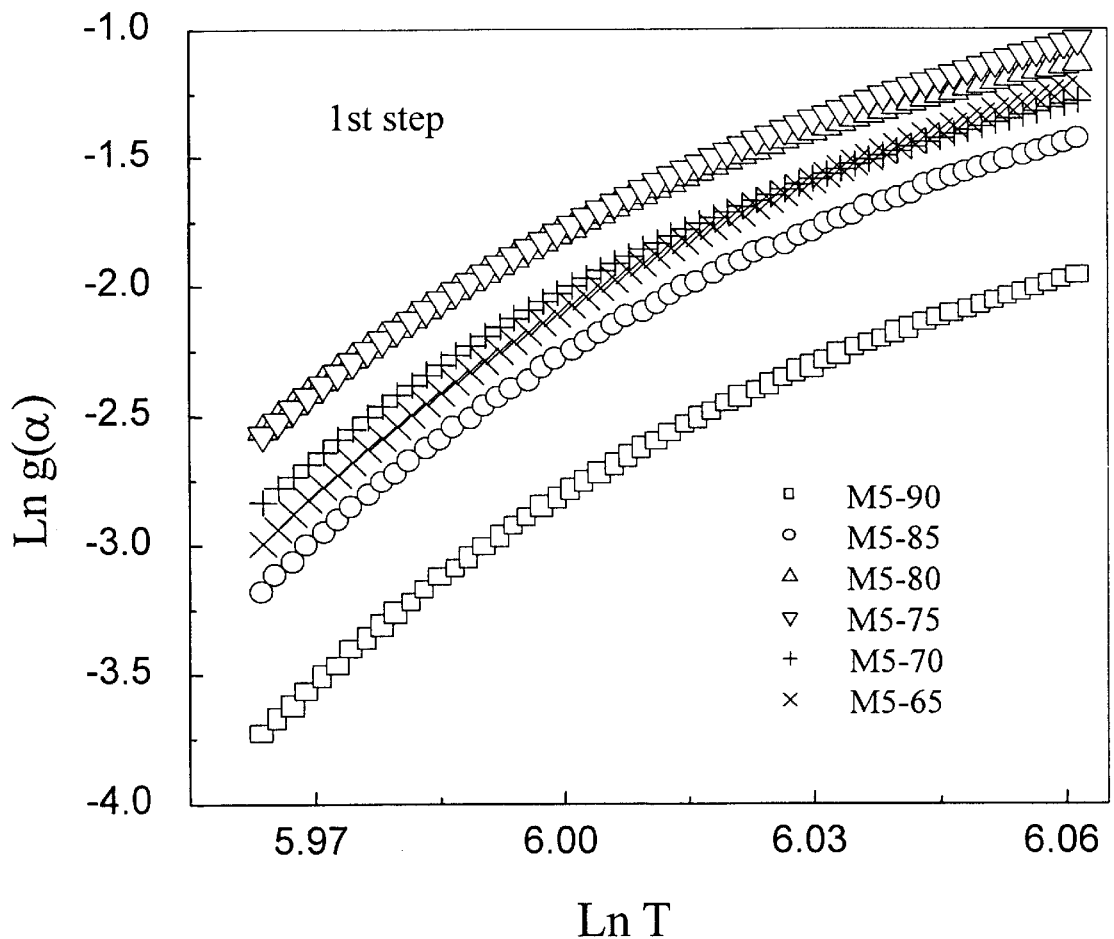
FIGS. 6 and 6a respectively are a Ln g($\alpha$) versus Ln T plot in the first stage pyrolysis and the second stage pyrolysis of the hybrids M5–90 (square), M5–85 (circle), M5–80 (triangle), M5–75 (inverse triangle), M5–70 (plus sign) and M5–65 (x shape) under nitrogen with a heating rate of 10° C./min, wherein g($\alpha$) and T represent an integration of the pyrolysis reaction rate and temperature, respectively.
Figure 6A:
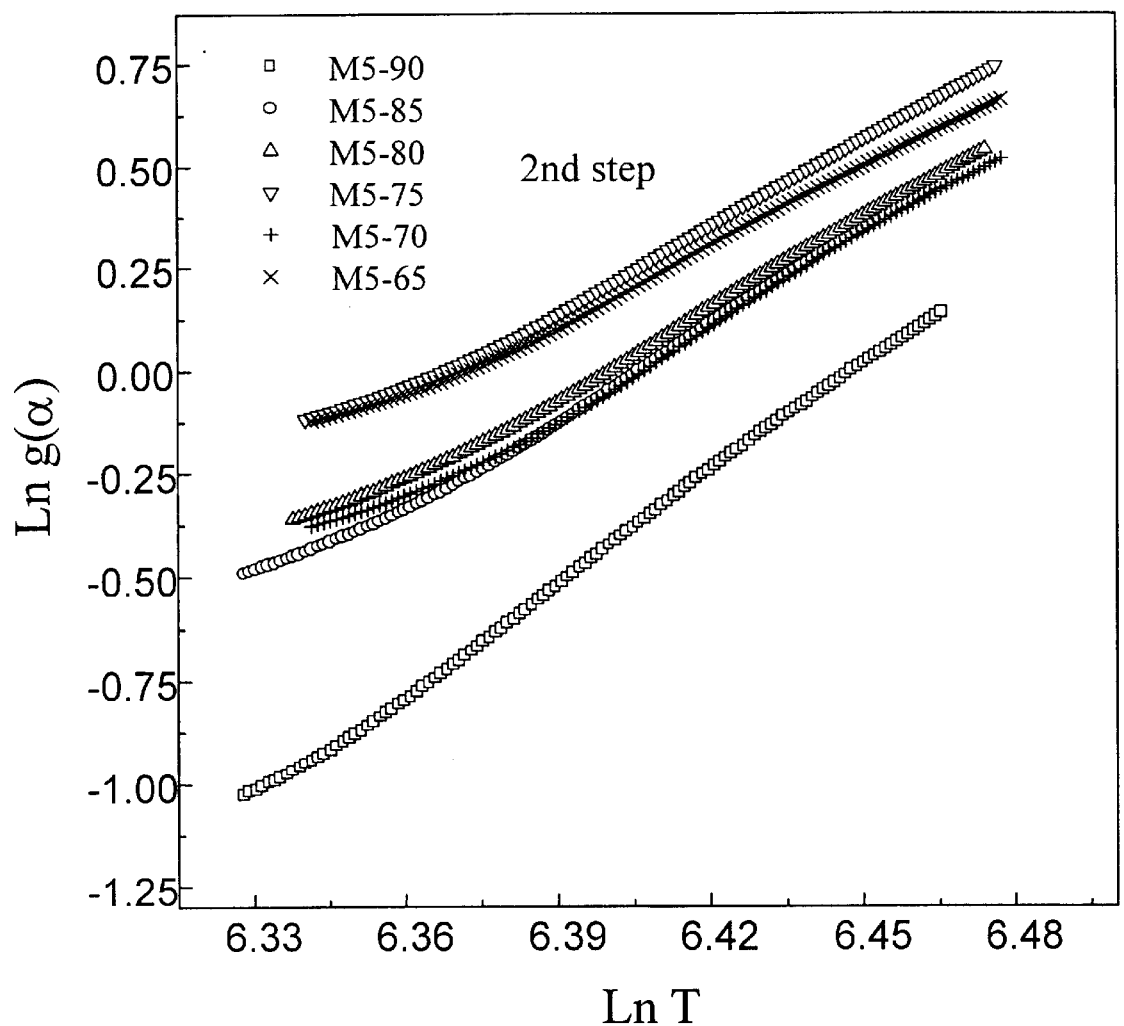

The order of pyrolysis, n, is determined by the Kissinger's formula. Regarding the n value of the first stage pyrolysis (i.e. dehydration), n$_1$, the n$_1$ value for a non-fully dehydrated hybrid is about 1.0 regardless under which kind of atmosphere; and the n$_1$ value is about 1.60 for a dehydrated hybrid. High n$_1$ value indicates that the first stage pyrolysis of the dehydrated hybrid is the removal of water from the surface of acidic silica. Furthermore, the pyrolysis n value of PVI (n$_2$) is independent from the dehydration, and has a value of about 1.72. The degree of pyrolysis, α, is defined as the ratio of the actual weight loss to the total weight loss. The pyrolysis rate for n≠1 is g(α)=[1–(1–α)$^{1-n}$]/(1–n). The overall activation energy of pyrolysis, E$_a$, is calculated by using the van Krevelen method.
When $$n \neq 1, Ln\ g(\alpha) = In[A(0.368/T_{max})^x/q(x+1)+(x+1)]Ln\ T$$

$$n=1, In[-In(1-\alpha)] = (x+1)Ln\ T$$

where g(α), A, T, q and X represent an integration of the pyrolysis reaction rate, factor prior to the exponent, temperature, heating rate, and X=E$_a$/RT$_{max}$. The activation energy can be calculated from the slope of the Ln g(α) versus Ln T plot, as shown in FIGS. 6 and 6a.

Figure 7:
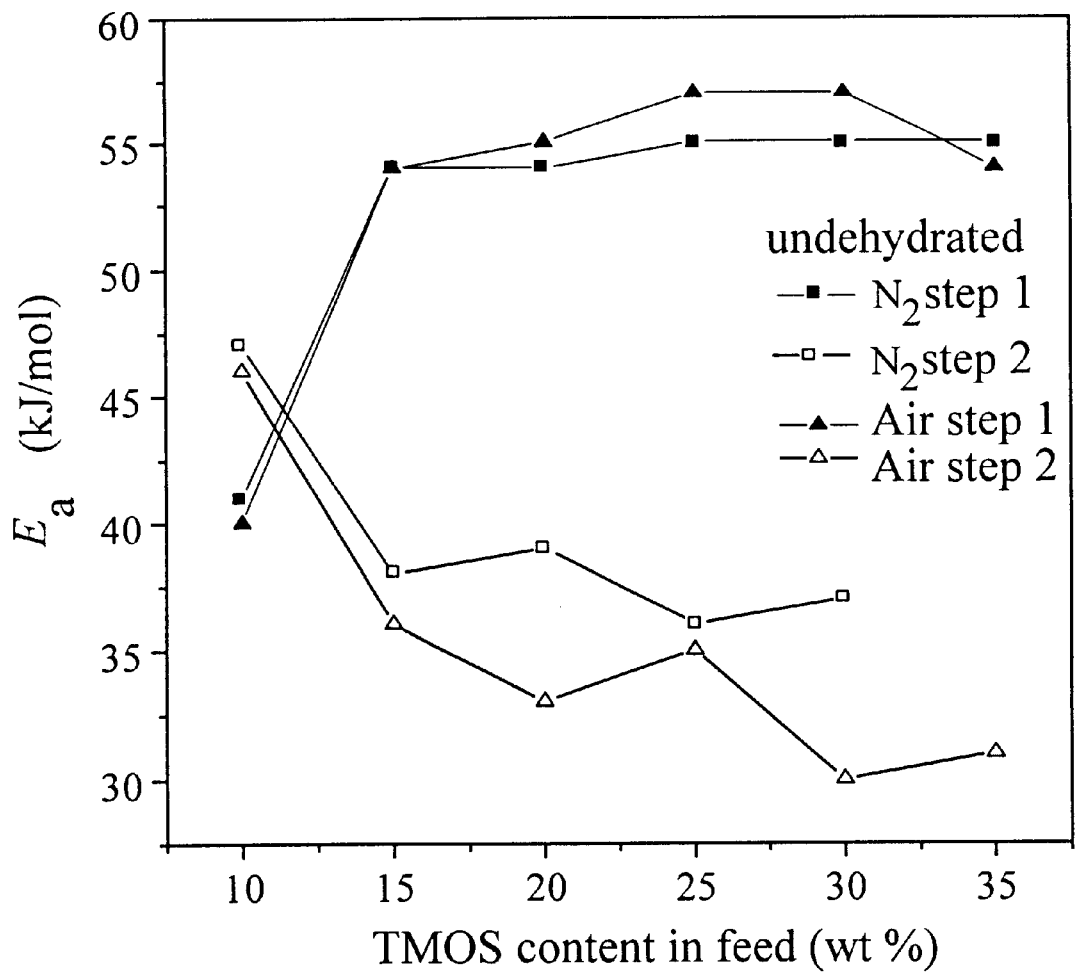
FIG. 7 shows the first stage ($E_{a1}$) and second stage ($E_{a2}$) overall pyrolysis activation energy of the non-fully dehydrated hybrids tested under nitrogen and air, wherein $E_{a1}$ and $E_{a2}$ obtained under nitrogen are represented by black rectangles and blank rectangles respectively, and $E_{a1}$ and $E_{a2}$ obtained under air are represented by black triangles and blank triangles respectively.
Figure 7A:
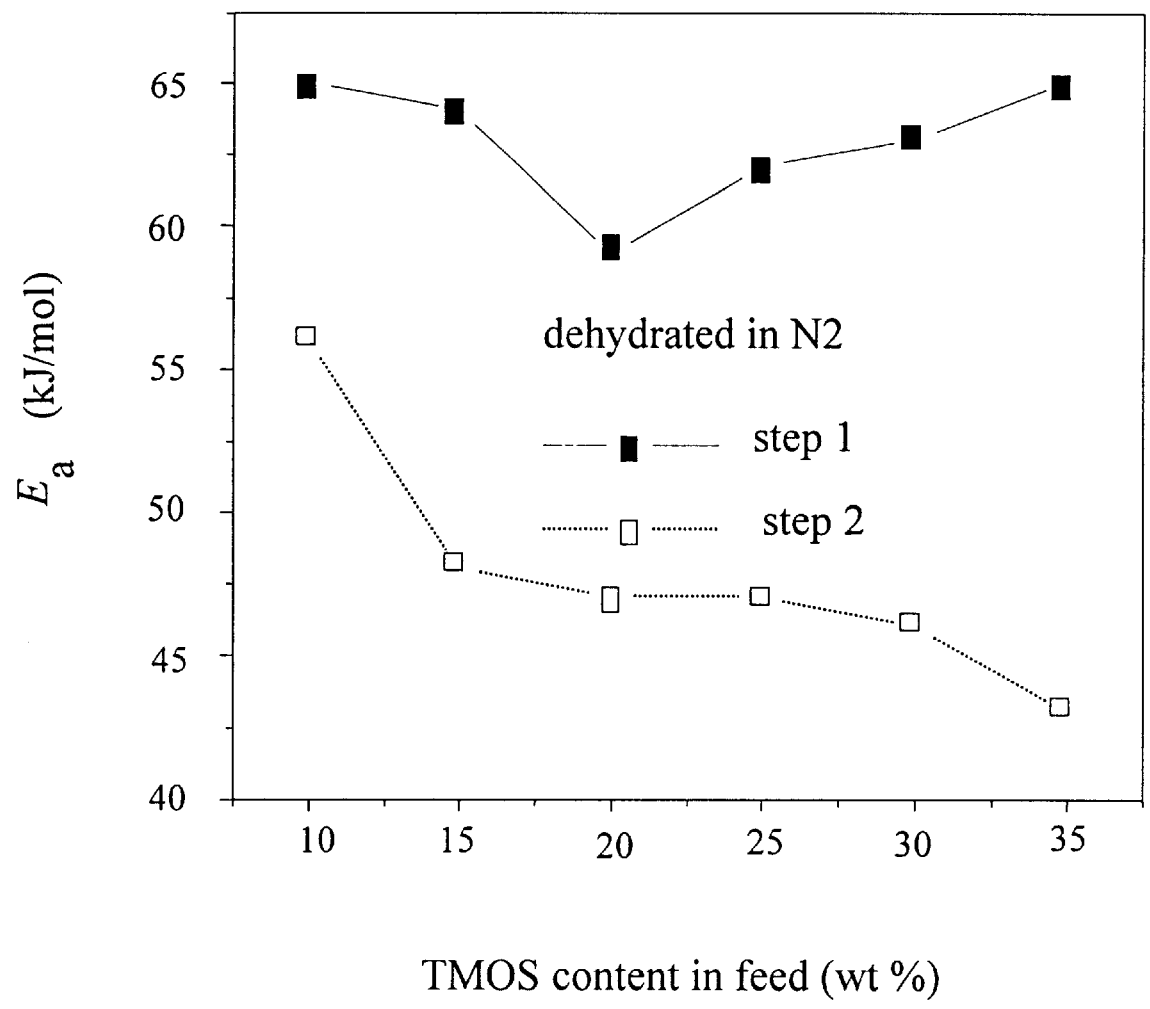
FIG. 7a shows the first stage ($E_{a1}$) and second stage ($E_{a2}$) overall pyrolysis activation energy of the dehydrated hybrids tested under nitrogen, wherein $E_{a1}$ and $E_{a2}$ obtained under nitrogen are represented by black rectangles and blank rectangles, respectively.

FIG. 7 shows the first stage (E$_{a1}$) and second stage (E$_{a2}$) overall pyrolysis activation energy of the non-fully dehydrated hybrids tested under nitrogen and air, wherein E$_{a1}$ and E$_{a2}$ obtained under nitrogen are represented by black rectangles and blank rectangles respectively, and E$_{a1}$ and E$_{a2}$ obtained under air are represented by black triangles and blank triangles respectively. FIG. 7a shows the first stage (E$_{a1}$) and second stage (E$_{a2}$) overall pyrolysis activation energy of the dehydrated hybrids tested under nitrogen, wherein E$_{a1}$ and E$_{a2}$ obtained under nitrogen are represented by black rectangles and blank rectangles, respectively. Average E$_{a1}$ and E$_{a2}$ are 55 and 35 kJ/mole, respectively, for hybrids that are not completely dehydrated. They are the dehydration of water and the decomposition of the PVI copolymer, respectively. Interestingly, the E$_{a1}$ and E$_{a2}$ values are relatively independent from the content of silica, when the TMOS content is greater than 20%. On the other hand, the E$_{a1}$ and E$_{a2}$ values of a dehydrated hybrid are about 10 kJ/mole higher than those of a non-fully dehydrated hybrid. The activation energy of the dehydrated hybrid is greater than a typical hydrogen bonding strength (~50 kJ/mole). These results show that maybe the SiOH species having an acidic surface will react with the absorbed water molecules to form a partially ionized $SiO^- \ldots H_3O^+$ composite. The dipole function of $SiO^- \ldots H_3O^+$ causes the activation energy of dehydration decreasing as the absorption of water increases. The higher $E_{a1}$ value of a dehydrated hybrid may be related to a lower amount of water being absorbed. However, the $E_{a2}$ value of a dehydrated hybrid decreases along with an increase in the silica content. This result indicates that silica may promote the cleavage of PVI bonds.

CONCLUSION

A PVI-silica hybrid was prepared by performing a free radical addition reaction of vinylimidazole and MSMA, and then hybridizing with TMOS by a sol-gel technique. IR, $^{29}Si$, $^{13}C$-NMR and DSC confirm that there are chemical bonding between silica and PVI. More three dimensional silica networks are formed in the hybrid when the content of TMOS is raised. The overall activation energy $E_a$ of the dehydration and the cleavage of PVI bonds in the hybrid were evaluated by the van Krevelen method. The average $E_a$ values of dehydration for the non-fully dehydrated hybrids and the dehydrated hybrids are 55 and 63 kJ/mole, respectively. The former has a lower $E_a$ of dehydration compared to the latter maybe caused by a stronger repulsion force between water molecules resulting from more $SiO^- \ldots H_3O^+$ dipoles existing in the non-fully dehydrated hybrid. In a hybrid that is not fully dehydrated, the $E_a$ of cleavage of PVI bonds is about 35 kJ/mole, and is 47 kJ/mole for a hybrid that is dehydrated. The higher value in the latter case perhaps is due to more $T^3$ structures in the hybrid.

Even though the present invention and its characteristics have been elaborated in detail, it should be understood that the people skilled in the art can make changes and modify the present invention without departing the scope of the claims described hereinafter.

What is claimed is:

1. A method for preparing a hybrid of polyvinylimidazole and silica, which comprises the following steps:
   a) copolymerizing vinylimidazole and a vinyl-containing alkoxysilane in an organic solvent to form a modified polyvinylimidazole having the following formula I;

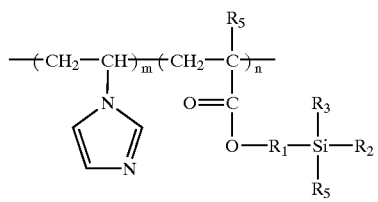

(I)

wherein m is an integer of 10–100, n is an integer of 5–30, $R_1$ is C1–C6 alkylene, $R_2$ is C1–C4 alkoxy, $R_3$ and $R_4$ independently are hydrogen, C1–C4 alkoxy or C1–C4 alkyl; and $R_5$ is hydrogen or C1–C4 alkyl, wherein a free radical initiator is used to initiate said copolymerization reaction; and
   b) adding water and an organic solution of tri- or tetra-(C1–C4 alkoxy)silane into the resulting copolymerization mixture from step a) to perform hydrolysis and condensation reactions of the modified polyvinylimidazole (I) and the tri- or tetra-alkoxy silane to form a hybrid of polyvinylimidazole and silica comprising the following network structure

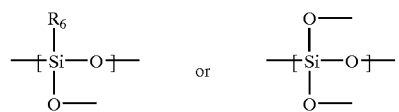

wherein $R_6$ is hydrogen or C1–C4 alkyl.

2. The method as claimed in claim 1, wherein said vinyl-containing alkoxysilane used in step a) is [3-(methacryloxy)propyl]trimethoxysilane.

3. The method as claimed in claim 1, wherein said tri- or tetra-(C1–C4 alkoxy)silane used in step b) is tetra-(C1–C4 alkoxy)silane.

4. The method as claimed in claim 3, wherein said tetra-(C1–C4 alkoxy)silane is tetramethoxysilane.

5. The method as claimed in claim 2, wherein the polyvinylimidazole and the [3-(methacryloxy)propyl] trimethoxysilane are copolymerized in a molar ratio of polyvinylimidazole to [3-(methacryloxy)propyl] trimethoxysilane from 99:1 to 80:20 in step a).

6. The method as claimed in claim 5, wherein the molar ratio of polyvinylimidazole to [3-(methacryloxy)propyl] trimethoxysilane is 95:5.

7. The method as claimed in claim 1, wherein the free radical initiator is azoisobutyronitrile.

8. The method as claimed in claim 4, wherein said tetramethoxysilane and said modified polyvinylimidazole (I) used in step b) are in a weight ratio of from 35:65 to 10:90.

9. The method as claimed in claim 4, wherein said water and said tetramethoxysilane used in step b) are in a molar ratio from 3:1 to 10:1.

10. The method as claimed in claim 1, wherein an acid is added into said water as a catalyst in step b), wherein the amount of said acid used is 1–5% by weight, based on the total weight of said water and said acid.

11. The method as claimed in claim 10, wherein said acid is hydrochloric acid.

12. The method as claimed in claim 1, wherein the organic solvent used in step a) and an organic solvent used to form said organic solution in step b) are selected from the group consisting of tetrahydrofuran (THF), N-methyl-2-pyrrolidone (NMP), N,N-dimethylacetamide (DMAc), dimethylformamide (DMF), dimethylsulfoxide (DMSO), m-cresol, pyridine (Py), methyl chloride, ethyl chloride and a mixture thereof.

13. The method as claimed in claim 9, wherein the organic solvent used in step a) and the organic solvent used to form said organic solution in step b) are tetrahydrofuran (THF).

* * * * *